United States Patent Office 3,056,753
Patented Oct. 2, 1962

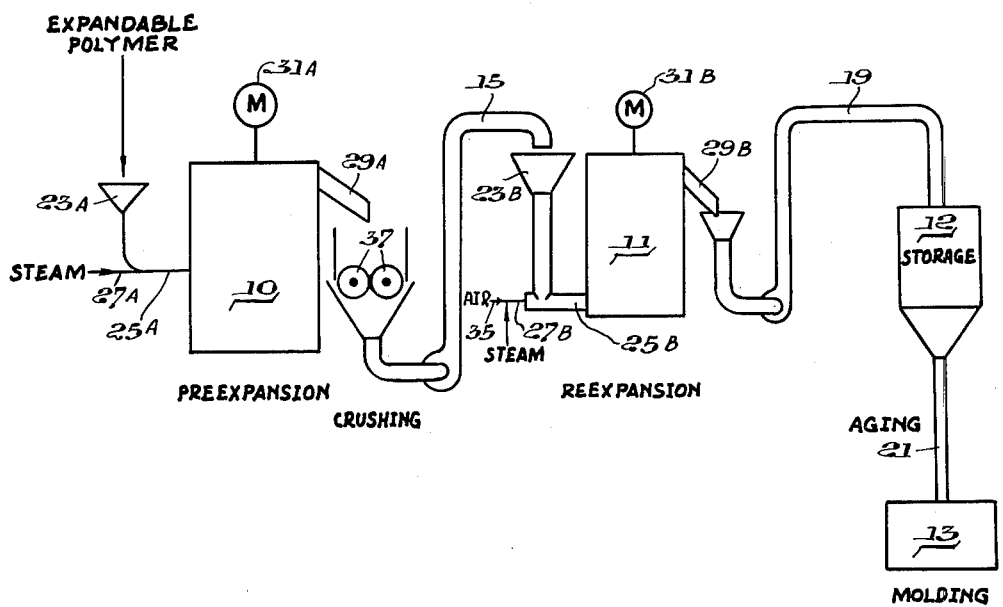

3,056,753
TREATMENT OF EXPANDABLE POLYMERIC PARTICLES
Michael F. Fronko, Monaca, Pa., assignor to Koppers Company, Inc., a corporation of Delaware
Filed Aug. 10, 1961, Ser. No. 130,666
4 Claims. (Cl. 260—2.5)

This invention relates generally to the production of articles having a foamed polymeric structure.

It has become commonplace to produce articles such as novelties, toys, floats, insulation and the like of material having a foamed, cellular, polymeric structure. Conveniently, such articles may be prepared in the manner described in Stastny et al. Patent No. 2,744,291. According to that patent, expandable polymeric particles which have from 5 to 15% of an expanding agent incorporated therein are placed in a mold and heated, for example, by the injection of steam to a temperature above the boiling point of the expanding agent but below the melting point of the polymer. Under the influence of heat, the particles expand, coalesce, and fuse together to fill the mold with a foamed polymeric structure. The mold is then cooled to a temperature at which this foamed structure will retain itself, and the article is removed from the mold.

The expandable polymeric particles are available under various trade names as, for example, expandable polystyrene is sold under the trademark "Dylite." Expandable polymers may conveniently be made in the manner described in the D'Alelio Patent No. 2,983,692. The expandable polymeric particles are called "beads." Since the expandable polymeric particles may expand from 10 to 30 times their original size, if the virgin particles are used, then the mold is filled to, for example, less than one-tenth of its volume. This presents the disadvantage that, due to the high insulating value of the expanded beads, every bead may not be completely expanded because it is not adequately exposed to the heat.

To overcome the foregoing disadvantage, it is customary to pre-expand the beads; that is, to heat the beads above the boiling point of the expanding agent but below the melting point of the polymer with agitation of the polymer without restraint, whereby the beads expand to almost their final size. A convenient method for carrying out this partial expansion is described in copending application Serial No. 689,195, now Patent No. 3,023,175. The mold can then be completely filled with these partially expanded beads. Upon subsequent heating, the beads further expand, coalesce and fuse together to form a mass conforming to the contour of the mold. The mass is then cooled to a temperature at which the polymeric material becomes self-supporting, that is, retains its cellular structure when removed from the mold.

The production of articles having a foamed polymeric structure involves generally a molding cycle that includes preheating the mold, charging the mold with expandable polymeric particles, heating the particles in the mold, and then cooling the resulting foamed structure to a temperature whereupon the material retains the foamed structure. In a typical molding cycle, the time consumed in this cycle breaks down as follows: Preheating requires about 16% of the time of the cycle; filling the mold requires about 6% of the time; heating the polymeric particles requires about 2% of the time; and cooling the finished product so that it can be removed from the mold requires about 76% of the time. The cooling of the finished product is a variable matter depending upon the configuration of the article, the size of the article, and the density of the resulting foamed structure. With all things being equal, molded articles of higher density will require more cooling time than molded articles of lower density, and articles having thicker sections than articles having thinner sections. If the mold be opened before the exterior part has hardened or before the interior is sufficiently cooled, "postexpansion" will occur, resulting in the distortion of the molded object. Since foamed polymeric material is an excellent thermal insulator, this cooling portion of the cycle is normally the longest step in the molding cycle and, while the other portions of the molding cycle take place in a matter of seconds, the cooling portion may require as much as several minutes.

It has now been found that the length of the cooling portion of the cycle can be decreased to a great extent by the treatment of the pre-expanded beads in accordance with this invention before the beads are charged to the mold. This treatment comprises pre-expanding the beads to a predetermined bulk density, crushing the freshly pre-expanded beads, and then re-expanding the crushed beads to the desired bulk density. This treatment yields expanded beads that mold readily but that require 40 to 60% less time in the cooling portion of the cycle than is normally required before the article can be removed from the mold in a self-sustaining condition.

The above and further objects and novel features of the invention will appear more fully from the detailed description when the same is read in conjunction with the accompanying drawing. It is to be expressly understood, however, that the drawing is not intended to be a definition of the invention but is for the purpose of illustration only.

The single sheet of drawing illustrates schematically the apparatus for carrying out the process of this invention.

Referring now to the drawing, the system comprises generally series connected pre-expanders 10 and 11, a storage 12 and a mold 13. A conduit 15 connects pre-expanders 10 and 11, a conduit 19 connects pre-expander 11 to storage 12, and a conduit 21 connects storage 12 to the mold 13.

As illustrated herein, pre-expanders 10 and 11 are of the type described in copending application Serial No. 689,195, now Patent No. 3,023,175. Steam aspirators, 27A, 27B, feed beads of expandable polymer from hoppers, 23A, 23B, through conduits 25A and 25B into the pre-expander. Generally, the steam pre-expander is a cylindrical stainless steel insulated vessel in which a stainless steel axial stirrer is driven by a motor. The stirrer is a shaft containing radially extending stirring bars. Fixed horizontal bars attached to the cylinder mesh with these stirring bars. Steam and expandable polymeric particles enter the vessel at the bottom of the vessel. As the particles of expandable polymer enter the vessel, they expand due to the heat of the steam and displace the more completely expanded particles, thus causing the expanded particles to move upwardly and discharge through overflow chutes 29A, 29B. The beads change density as they expand or puff. Motors, 31A, 31B, provide agitation for the beads so as to prevent agglomeration of the beads during this expansion process.

In accordance with this invention, the partially expanded polymeric particles from chute 29A are passed through crushing rolls 37 and then fed onto the pre-expander 11 where the crushed beads are again expanded.

Rolls 37 may be lightweight hollow rolls. Rolls, for example, 12" in diameter by 24" long made from cast stainless steel pipe have been found to be satisfactory. These rolls may be driven by a conventional electric motor; for example, the rolls may be driven by a ¾ h.p. variable speed drive. A roll speed of 110 revolutions per minute will crush 120 lbs./hour of beads from a density of 1 to 2 lbs./cubic foot.

Care should be taken not to overcrush the pre-expanded beads. For best results, the bulk density of the pre-expanded beads should be increased not more than two and a half times during the crushing step; for example, if it is desired to mold a material having a 1 lb./cu. ft. density, the virgin beads would be expanded in expander 10 to a density of 1 lb./cu. ft., then crushed to a density of 2 to 2½ lbs./cu. ft. Then the material is re-expanded to 1 lb./cu. ft. The bulk density of the particles is readily obtained by weighing 625 cu. cm. of the particles. Each ten grams of the particles then represents a bulk density of 1 lb./cu. ft. For example, if 625 cu. cm. of particles weight 12.5 grams, the bulk density is 1.25 lbs./cu. ft.

Inasmuch as the beads expand rapidly in the pre-expander 11, air is fed through a line 35 along with the steam so as to reduce the amount of heat supplied to the beads and to reduce the time in which the beads remain in the pre-expander. The overflow from 29B of pre-expander 11 is conducted by way of conduit 19 to storage 12 where the particles are preferably aged. During this aging, the particles remain for 6 to 10 hours during which the particles apparently become filled with atmospheric air. Such aging avoids shrinkage of the foamed structure from the mold.

The particles are then charged to a mold 13 of desired configuration. This mold 13 may be of a conventional type such, for example, as described in the "Dylite" booklet, copyrighted 1953, page 38. Steam injected into the mold causes the particles to expand, fuse together, and coalesce to form a structure conforming to the shape of the mold. The structure is then cooled until it has been lowered to a temperature sufficient to retain the foamed structure. The article is then removed from the mold.

The fusion time required for molding the crushed and re-expanded beads is identical to the time required for normal noncrushed material. The treatment of the beads, in accordance with this invention, however, results in a cooling time reduction of normally 50% compared with standard techniques.

To illustrate further the invention, a mold for producing a block of foamed polymeric material having the dimensions 12" x 12" x 2" was preheated for 35 seconds and then was charged with pre-expanded expandable polystyrene (sold under the trade name "Dylite") and heated with steam in a conventional fashion. The time required for the charging of the mold with expandable polystyrene was 15 seconds, and the time during which the mold was heated by applying steam thereto was 6–8 seconds. The structure was then cooled until the material could be removed without collapse or pre-expansion of the foamed structure. The cooling times required for particles of expandable polystyrene which have been pre-expanded in a conventional manner and then charged into the mold in a conventional fashion and those particles of expandable polystyrene which have been treated in accordance with this invention are illustrated below.

| Ex. | Pre-Expanded Density, Lbs./Cu. Ft. | Crushed Density, Lbs./Cu. Ft. | Re-Expanded Density, Lbs./Cu. Ft. | Cooling Time, Minutes |
| --- | --- | --- | --- | --- |
| 1 | 2.0 | No | No | 6 |
| 2 | 1.0 | 2.0 | No | 2 |
| 3 | 1.0 | No | No | 4 |
| 4 | 1.0 | 2.5 | 1.0 | 2 |

The contrast is also shown in the following examples wherein 12" cubes were molded:

| Ex. | Pre-Expanded Density, Lbs./Cu. Ft. | Crushed Density, Lbs./Cu. Ft. | Re-Expanded Density, Lbs./Cu. Ft. | Cooling Time, Minutes |
| --- | --- | --- | --- | --- |
| 5 | 1.0 | No | No | 17 |
| 6 | 1.0 | 2.25 | 1.0 | 7 |
| 7 | 1.0 | No | No | 14 |

The foregoing has presented a novel process for the production of articles having a foamed polymeric structure. In accordance with this invention, the production of a normal mold may be increased by decreasing the cooling time required to enable the articles to retain their foamed structure.

What is claimed:
1. A process for treating expandable polymeric particles so as to decrease the time required in the cooling portion of a molding cycle, which comprises: partially expanding the polymeric particles, crushing the particles, and thereafter again partially expanding the particles.

2. A process for treating expandable polymeric particles so as to decrease the time required in the cooling portion of a molding cycle, which comprises: partially expanding the polymeric particles, crushing the particles, and thereafter charging the particles to a mold of desired configuration, heating the particles to a temperature above the boiling point of the expanding agent but below the melting point of the particles, cooling the resulting foamed structure, and removing the structure from the mold.

3. A process for treating expandable polymeric particles so as to decrease the time required in the cooling portion of a molding cycle, which comprises: partially expanding the polymeric particles, crushing the particles to 2½ times the density of the partially expanded particles, and thereafter again partially expanding the particles.

4. A process for treating expandable polymeric particles so as to decrease the time required in the cooling portion of a molding cycle, which comprises: partially expanding the polymeric particles, crushing the particles immediately after the partial expansion and while the particles are still hot, and thereafter again partially expanding the particles.

References Cited in the file of this patent
UNITED STATES PATENTS

| | | |
| --- | --- | --- |
| 1,045,234 | Willis et al. | Nov. 26, 1912 |
| 2,744,291 | Stastny et al. | May 8, 1956 |
| 2,986,537 | Chaumenton | May 30, 1961 |
| 3,015,479 | Edberg et al. | Jan. 2, 1962 |
| 3,023,175 | Rodman | Feb. 27, 1962 |